United States Patent
Benz et al.

(10) Patent No.: US 7,864,303 B1
(45) Date of Patent: Jan. 4, 2011

(54) METHOD FOR ELECTRONIC MEASUREMENT

(75) Inventors: Paul Benz, Diepoldsau (CH); Jürg Hinderling, Marbach (CH); Martin De-Lange, Kesswil (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 11/721,954

(22) PCT Filed: Dec. 9, 2005

(86) PCT No.: PCT/EP2005/013241
§ 371 (c)(1),
(2), (4) Date: Jun. 29, 2007

(87) PCT Pub. No.: WO2006/063739
PCT Pub. Date: Jun. 22, 2006

(30) Foreign Application Priority Data
Dec. 18, 2004  (EP) ................... 04030086

(51) Int. Cl.
*G01C 3/08* (2006.01)
(52) U.S. Cl. .............. 356/5.15; 356/3.01; 356/4.1; 356/5.1
(58) Field of Classification Search ....... 356/3.01–3.15, 356/4.01–4.1, 5.01–5.15, 6–22
See application file for complete search history.

(56) References Cited

U.S. PATENT DOCUMENTS

| 5,428,439 | A | 6/1995 | Parker et al. |
| 5,889,490 | A | 3/1999 | Wachter et al. |
| 2002/0071109 | A1* | 6/2002 | Allen et al. ................ 356/5.01 |
| 2004/0105087 | A1* | 6/2004 | Gogolla et al. .................. 356/3 |
| 2005/0234319 | A1* | 10/2005 | Mandelis et al. ............ 600/407 |
| 2006/0119833 | A1* | 6/2006 | Hinderling et al. ......... 356/5.11 |

FOREIGN PATENT DOCUMENTS

| DE | 101 12 833 | 3/2003 |
| EP | 1 450 128 | 8/2004 |
| WO | WO2004/074773 | * 9/2004 |

* cited by examiner

*Primary Examiner*—Thomas H Tarcza
*Assistant Examiner*—Luke D Ratcliffe
(74) *Attorney, Agent, or Firm*—Workman Nydegger

(57) ABSTRACT

According to the invention, the sensitivity of a method for electronic measurement may be improved, carried out by the principle of heterodyne reception with the steps of broadcast of pulsed electromagnetic radiation (ES) with at least one pulse repetition frequency, reception of back-scattered radiation (RS), whereby the back-scattered radiation (RS) is converted into a received signal, mixing of the received signals, determination of at least one time parameter from the at least one output signal, whereby on mixing the received signals at least two pulsed mixed signals are mixed to give at least two output signals and the at least two mixed signals are phase-shifted relative to each other.

23 Claims, 3 Drawing Sheets

METHOD FOR ELECTRONIC MEASUREMENT

The invention relates to a method for electronic measurement based on the principle of heterodyne reception according to the preamble of claim 1, a measuring apparatus according to the preamble of claim 10 and a computer program product.

In the area of methods for electronic measurement, various principles and methods are known, high-frequency signals being converted down to low-frequency signals by nonlinear mixing with a mixer signal according to the principle of heterodyne reception for easier evaluation. The mixer is operated both in heterodyne and homodyne receivers in order to convert the input signal into another frequency range. Depending on the receiver type, different mixer circuits are used, the differences between which should be represented and qualitatively evaluated.

In the special case of homodyne reception, the mixed signal of the local oscillator and radiation to be measured correspond in their modulation frequency. The beat signal resulting from the nonlinear mixing corresponds to a DC signal whose magnitude depends on the phase position of the received radiation relative to the local oscillator.

In the heterodyne principle, on the other hand, a local oscillator produces a mixer signal which differs in its frequency from the modulated measured signal. The heterodyne principle is used, for example, in range finders based on the phase difference principle, in which electromagnetic radiation is emitted in the visible or infrared range.

Other carriers which are used in association with the principle of heterodyne reception for distance measurement are of course also known. One example of this is radar technology.

In the phase measurement technique, amplitude-modulated light pulses—usually sinusoidal or square-wave signals—are emitted with repetition frequencies in the range from a few MHz to a few GHz. Conventional CW laser diodes having peak powers of a few mW may also be used as light sources, in addition to LEDs. The average emitted energy is sufficiently high and the visibility of the laser spot on the target for the distances to be measured by phase-measuring devices is therefore not a problem.

For distance measurement, the phase position of the emitted signal is compared with that of the returning signal. The phase shift is proportional to the measured distance. The RF signal received by a photodiode is amplified and is converted down to a lower frequency band, true to phase, with the aid of a phase-locked-loop (PLL)-regulated local oscillator signal.

Instead of high-frequency signal sampling with sampling rates in the GHz range, a substantially simpler procedure can be followed using a low-frequency receiver signal. Here, the sampling and analogue/digital conversion in the low-frequency (LF) range is more or less a magnitude simpler, more accurate and less current-consuming. In conventional phase-measuring devices, only the fundamental harmonic of the down-converted LF signal is used.

For achieving sufficient distance or absolute measurement accuracy, an internal light path (calibration or reference distance) and an external light path (measuring distance) are usually measured in succession. In this way, changes in transit times can be calibrated in the electronics. The calibration of the transit time changes can also be realized by means of two identical, parallel receiving channels. Accurate distance measurement is possible in the case of phase-measuring devices only with 2 channels. The advantages of such a phase-measuring device are in particular simple design, measurement at LF level and the reliable beam sources obtainable. A major disadvantage of the phase-measuring devices on the other hand is their susceptibility to faults due to insufficient suppression of optical or electronic crosstalk between transmitting and receiving channel; a further disadvantage is their generally low detection sensitivity.

Transit time range finders based on the pulse principle on the other hand do not have these disadvantages, but their accuracy of measurement is often too inexact for geodetic surveying, particularly if sub-mm accuracies are required.

In the case of transit time range finders, a light pulse is likewise emitted, this light pulse being split by suitable optical measures so that a part is passed via an internal light path (calibration distance) directly to the receiver, whereas the remaining component of the light is sent out of the device via the external light path. The light pulse is a pulsed signal having an intensity curve which has a peak value. The peak value or the position thereof defines in principle a time-related reference variable for deriving the signal transit time, which, in the case of suitable resolution or evaluation, can be determined.

The external component of a light pulse strikes the target standing some distance away—the distance to be measured (=measured distance) and is reflected back from there and passed via a suitable optical system to the same receiver, the receiver expediently being a photodiode with down-circuit amplifier.

The light pulse passed via the internal light path produces in the receiver a reference pulse which is referred to below as start pulse. The light pulse passed via the external light pulse (measured distance) produces in the receiver the so-called measured pulse, which is referred to below as stop pulse.

Since the lengths of the internal and of the external light path are different, the two light pulses arrive at the receiver at different times. The time difference between start pulse and stop pulse is defined as transit time and is proportional to the difference between the lengths of internal and external light paths. The time differences to be measured are very small, i.e. they must be determined extremely accurately in order to arrive at a geodetic accuracy of mm or sub-mm which is suitable for a useable distance-measuring system. The disadvantages of the pulse range finders lie in the very complicated apparatus for time measurement. For determining the transit time, the received signal is generally digitized, for which purpose very complex high-frequency electronic circuits with sampling rates in the GHz range are required.

The complexity of the transit time measurement in the case of the pulse range finder can be considerably simplified with the use of the heterodyne principle. There, an RF pulsed signal, which is produced, for example by a PLL-regulated local oscillator with a slightly different frequency, is mixed with the received pulse train by multiplication. In contrast to the phase-measuring device, in this method all harmonics are concomitantly used. This results in a time-dilated image of the high-frequency start and stop pulse in the LF range. The choice of the factor for an expedient time dilation is dependent in each case on the pulse frequency of the transmitter. For example, at a pulse frequency of 1 MHz, a dilation factor of 1 MHz/1 (MHz/128)=128 is sufficient; on the other hand, at a pulse frequency of 100 MHz, a dilation factor in the region of 500 MHz/(1 MHz/12)=64 000 is required.

The distance between start and stop pulse of the time-dilated and low pass-filtered output signal can easily be measured with the aid of low-frequency sampling ($\leq$1 MHz); it is proportional to the measured distance to be determined.

However, this method has the disadvantage that, even in the case of an evaluation of the harmonics of the LF-transformed received signal, a large part of the time or distance information present in the original RF signal is lost owing to the time dilation of the received signal (start and stop pulse). The Nyquist criterion is infringed thereby if at least two sampling passes are not present per period of the highest harmonic of the RF received pulses. This loss arises through the heterodyne principle in which, as in a subsampling system, RF received pulses are from time to time not met by a mixer pulse (=sampling pulse). The transit time information of these RF received pulses is not determined by the heterodyne time or frequency transformation and therefore does not contribute to the LF signal because it falls into the mixer gaps.

An object of the invention is to provide a method of measurement or a measuring apparatus for transit time determination with increased accuracy.

A further object of the invention is to provide a method of measurement or a measuring apparatus for transit time determination with increased signal sensitivity.

A further object of the present invention is to improve the use of signal information on reception of signals according to the homodyne or heterodyne principle.

These objects are achieved by the subjects of claim 1 and 10, respectively, or of the dependent claims or the solutions are further developed.

The invention provides both a novel method for electronic measurement based on the principle of heterodyne reception and a corresponding measuring apparatus comprising a plurality of mixers. The method of measurement according to the invention and the measuring apparatus are not limited to those variants of heterodyne reception with optical radiation as a carrier which are described purely by way of example below. For example, it is also possible according to the invention to use carriers in the radio, microwave or sub-mm wavelength range.

The principle according to the invention compensates for the loss of signal information in heterodyne reception by simultaneously converting RF received pulses, parallel with a plurality of phase-shifted mixer pulsed signals, into a plurality of separate LF signals, in-phase summation or combination of these LF signals with one another and combination to give a single received signal being possible. Because neither noise nor pulses are correlated in this parallel mixer system, the signal/noise ratio improves with the number of mixer channels. In this context, in-phase combination means that the phase shift for aggregation corresponds exactly to the phase shifts of the coordinated mixer signals. To this extent, an in-phase insertion of the sampling values between the sampling values of the other mixer signals is effected. An RF pulsed signal, for example produced by a PLL-regulated local oscillator, can be used as a mixer signal.

The optimum number M of mixer signals of different phases depends on the pulse duration and the pulse period $T_i$ of the high-frequency transmitted signals, in particular of the transmitted signals with the highest frequency $F_i=1/T_i$. The maximum number M of mixer signals corresponds to twice the quotient of pulse period to pulse width (pulse duration). This plurality of low-frequency signals emerging at the outputs of the mixer channels can now be subjected to in-phase summation with one another or digital combination. The principle is therefore based on subsampling with two or more analogue samplers which are phase-shifted relative to one another and lead to a gain in information.

The electronic or electrooptical method of measurement according to the invention and the measuring apparatus according to the invention are described in more detail or explained below purely by way of example with reference to working examples shown schematically in the drawing. Specifically, FIG. 1 schematically shows the block diagram of an embodiment of the measuring apparatus according to the invention;

Figure 6:
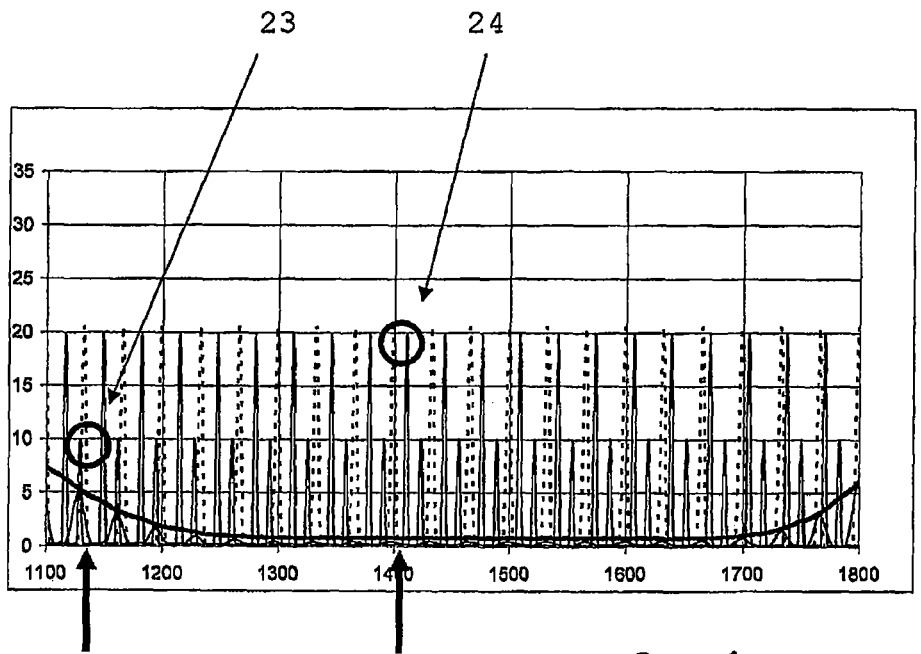

FIG. 6 schematically shows the effect of the heterodyne subsampling for the case of only one mixer signal.

Figure 1:
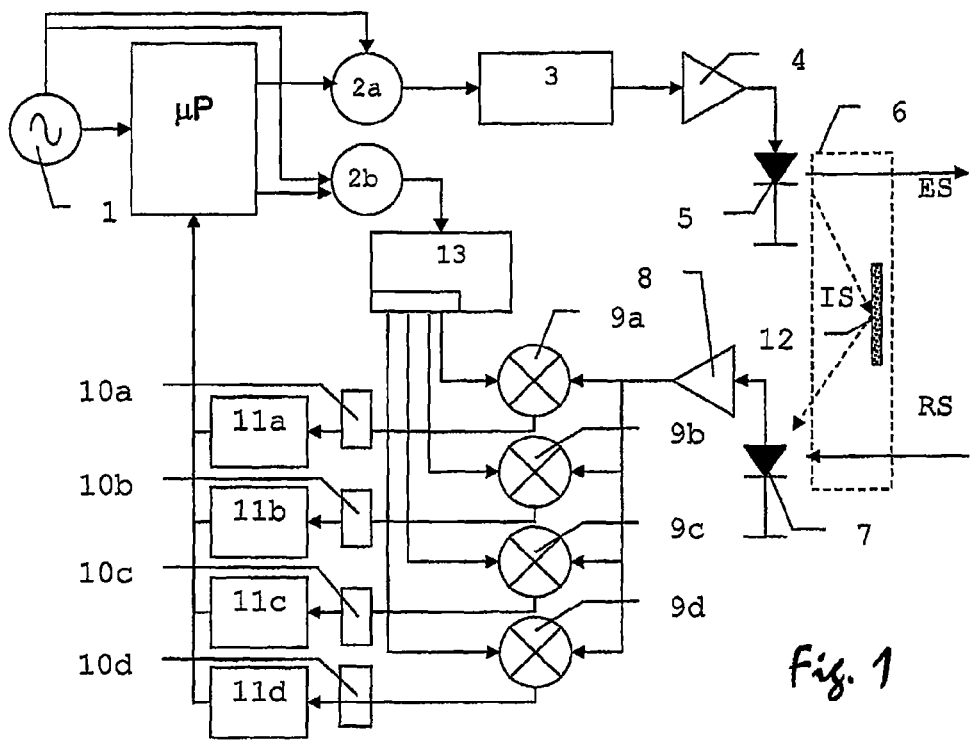

FIG. 1 shows a block diagram of an embodiment of the measuring apparatus according to the invention, based on the principle of heterodyne reception with a sensitivity substantially increased compared with the known method for phase distance measurement.

At the start of a signal chain, there is a crystal-calibrated reference oscillator having a typical accuracy of 0.5-5 ppm. A so-called direct digital frequency synthesizer 2a is present in the transmitting channel. Depending on programming by the microcontroller or microprocessor µP, element 2a produces the desired frequency in the region of a few kHz or MHz. The frequency converter 3 is likewise coordinated with the transmitting channel and multiplies the frequency to higher ranges so that the measuring frequency $F_i$ results. In addition, the frequency converter 3 acts as a filter and ensures spectral signal purity. For the coarse distance measurement, a plurality of frequencies $F_i$, preferably close together, are transmitted, similarly to the phase-measuring device. A driver stage 4 converts the control frequency into electrical pulses of short duration and drives the light source 5, such as, for example, a laser diode, which subsequently generates an emission correlated with the electrical pulse curve and having a time-dependent intensity increase and an intensity drop following a peak value. A part of this peak-like light pulse is directed as emitted signal ES toward the target object to be measured, and the other part is passed as internal signal IS via a beam splitter directly to the optical receiver. The arrangement 6 corresponds to the internal reference light path by means of which the respective start pulses are produced. The light pulses reflected by the target object and received are passed as reflected signals RS simultaneously or parallel to the same optical receiver 7 and form the stop pulses.

With a plurality of mixer modules 9a, 9b, 9c, 9d arranged in parallel, the loss-associated effect of signal subsampling can be eliminated. In this extended apparatus, the frequency converter stage 13 produces, for example, four high-frequency control signal pulses which are once again slightly frequency-shifted relative to the transmitting channel. The phases of these control signals are preferably shifted relative to one another in integral steps of (2π/number of control signals).

The mixer modules 9a, 9b, 9c, 9d therefore also produce signals shifted by these phase steps at their outputs coordinated with the low-pass filters 10a, 10b, 10c, 10d. The time-transformed signals are digitized virtually simultaneously in coordinated analogue/digital converters 11a, 11b, 11c and 11d and are stored by the microprocessor µP in the memory.

The loss of signal/noise ratio which occurs in heterodyne reception through subsampling is eliminated in postprocessing by cumulatively summing the four digital signal pulse sequences in-phase and in particular in the preferably integral steps of (2π/number of control signals) to give a single signal pulse sequence.

The sensitivity of the inventive method of measurement is increased by the root (M) compared with the convention heterodyne or homodyne reception.

As a measured variable for determining the transit time of the signal via the external light path, the time-transformed relative lag $x_i$ between the stop pulse and the start pulse in relation to the time-transformed pulse distance $T_i$ is calculated as a measured variable for each laser pulse frequency $F_i$. The time-based interpolation between the sampling points of the AD converter 11a, 11b, 11c, 11d is effected by the cross-correlation method or a functional method of fit.

The distance to be determined is calculated as follows:

$$D = N_i \cdot L_i + x_i \cdot L_i \quad (1)$$

Here, $N_i$ is the number of stop pulses between distance-measuring instrument and target object and $L_i$ is the pulse distance between two transmitted pulses.

The ambiguity $N_i$ is solved, for example, by the method of calculating the difference between the measured values $x_i$ coordinated with the measuring frequencies $F_i$. These values are coordinated with long pulse periods which are comparable with the length of the longest distance which can still be unambiguously resolved and is known terminologically to the person skilled in the art as unambiguity range. These strategies relevant in practice for determining the ambiguity parameters $M_i$ from the set of relative lags $x_i$ are known to the person skilled in the art, for example from the resolution of phase ambiguities in the GPS algorithm.

Figure 2:
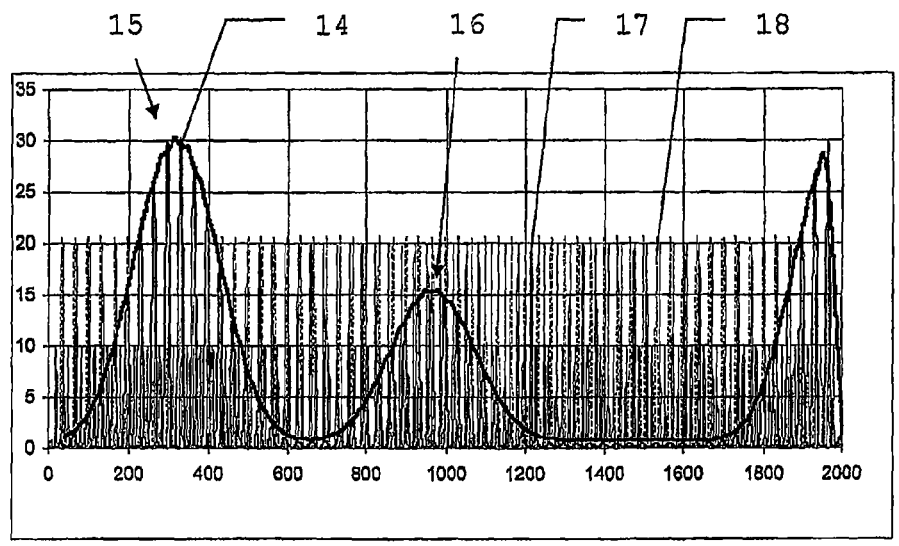
FIG. 2 shows the signals before and after high-frequency, heterodyne mixing.

FIG. 2 shows the signals before and after the high-frequency, heterodyne mixing at only one of the mixer modules. The RF received signal 17 having the pulse period $T_i=1/F_i$ consists of start and stop pulses and is mixed electrically analogously by a mixer signal 18 consisting of single pulses and having a frequency shifted slightly relative to the pulse period $1/F_i$. An amplitude-modulated output signal having an underlaid high carrier frequency forms at the output of the mixer. The envelope 14 of this output signal has two signal pulses, one of which is coordinated with the time-transformed start pulse 15 and the other of which is coordinated with the time-transformed stop pulse 16. With the time dilation of the signals, the advantage is utilized—as in the conventional phase measurement—that the signals in the low-frequency range can be further processed and digitized using economical electronic components. Moreover, the influence of the systematic transit time errors of the electronic components is reduced by the time dilation factor of the mixer stage, which considerably promotes the accuracy of measurement of the apparatus. According to the invention, the output signals produced by at least two mixed signals and the transit times determined therefrom are combined, i.e. in the simplest case the expected value is calculated.

Figure 3:
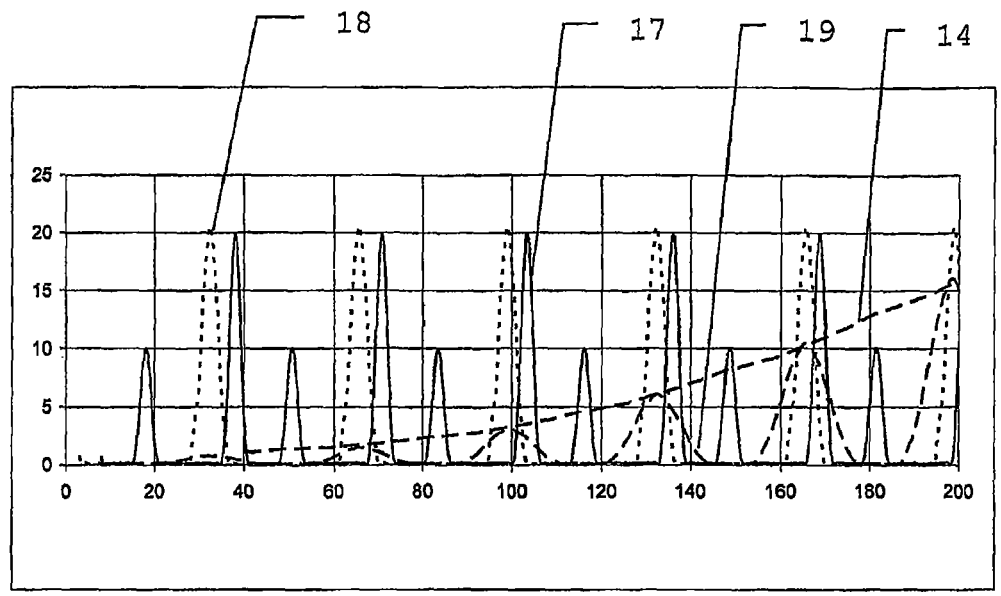
FIG. 3 shows the signals before and after high-frequency, heterodyne mixing on a larger scale.

FIG. 3 shows a section of the signals of FIG. 2 in time-dilated representation. Here, it is shown how the stop pulse is not amplified and the start pulse is only partly amplified in the RF received signal 17. Therefore, only the start pulse is passed to the output of the mixer while the stop pulse is lost in this phase. An output signal 19 having a comparably higher frequency but with additional amplitude modulation forms at the output of the mixer. The envelope 14 of the output signal 19 is also shown. In the method of measurement according to the invention using at least two mixer signals acting simultaneously but phase-shifted relative to one another, this loss of signal information is not present or only partly present, depending on the extent to which the number M of mixer signals differs from twice the quotient of pulse period to pulse duration of the input signal.

Figure 4:
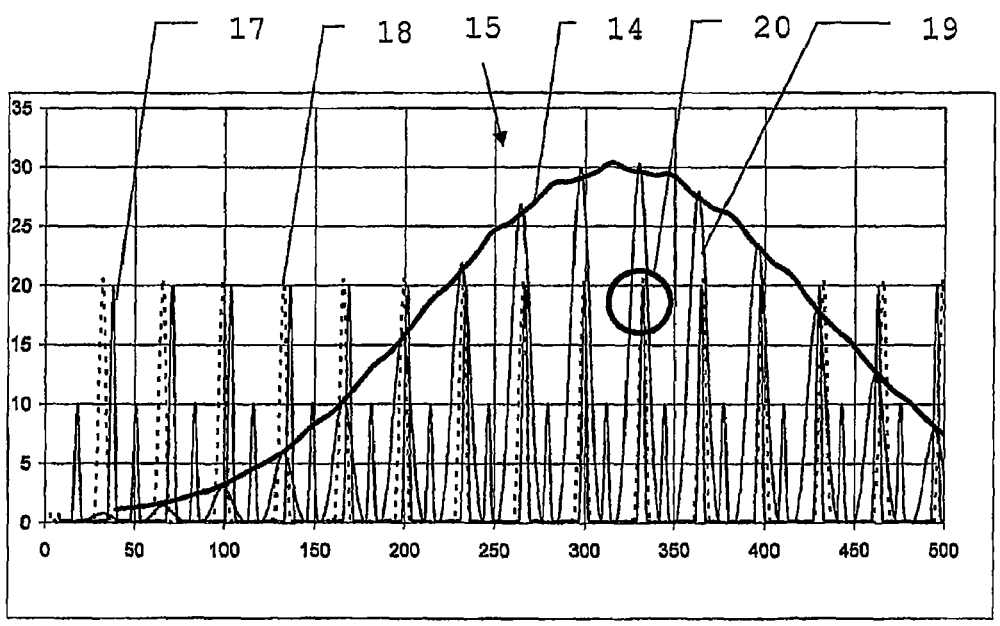
FIG. 4 shows the signals before and after high-frequency, heterodyne mixing on a larger scale and with a representation of the transformed start pulse.

FIG. 4 likewise shows an enlarged section of FIG. 2; in addition, the envelope 14 or the low pass-filtered and time-dilated start pulse 15 is shown. In the region 20 shown by way of example, the acquisition of the start pulse in the received signal 17 by the mixer signal 18 and hence the passage to the output are evident. The time-shifted, smaller stop pulse in the received signal is on the other hand not acquired by the mixer signal 18 in this phase and therefore does not appear at the output of the mixer. A high-frequency, amplitude-modulated output signal 19, of which the envelope 14 describes the time-transformed start or stop signal, is passed on. This loss of signal information, too, is reduced or eliminated by the method of measurement according to the invention.

Figure 5:
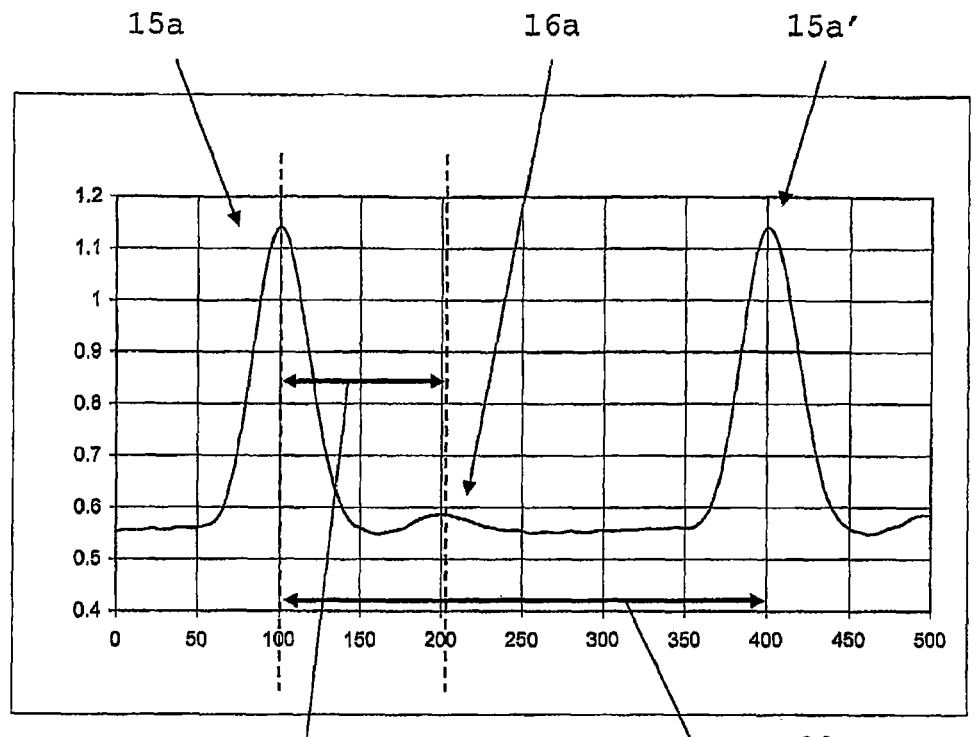
FIG. 5 shows an LF signal pulse sequence consisting of start and stop pulse, transformed to the low-frequency range.

FIG. 5 shows a received signal transformed into the low frequency range. The period of a signal pulse sequence comprises a first start pulse 15a and a stop pulse 16a, a second stop pulse 15a' following with a time-dilated pulse interval 22 as $L_i$ also being evident in this diagram. Here, the measured variable to be determined is the time, i.e. the lag 21 between first start pulse 15a and the stop pulse 16a. After sampling by means of an AD converter, the lag 21 and hence the cycle $x_i$ can be calculated as a ratio between lag 21 and $T_i$. The calculation of the distance to the target object is carried out by means of the relationship (1).

$$D = N_i \cdot L_i + x_1 \cdot L_i$$

There are several numerical methods for solving the ambiguity parameter $N_i$, i.e. the number of transmitted pulses between instrument and target object. Thus, various suitable methods are known from radar or GPS satellite surveying technology. The GPS algorithm already mentioned includes methods of difference calculation and of linear combination (LC), in particular narrowline LC or widelane LC.

Multiple targets result in the appearance of additional stop pulses whose cycles $x_i$ can be measured separately at each modulation transmission frequency $F_i$, as shown by way of illustration in FIG. 5. The possibility of being able to measure distances to staggered target objects is a particular strength of the invented apparatus.

FIG. 6 clearly illustrates the effect of heterodyne subsampling in the case of the heterodyne technique to date. If the apparatus comprises only a single higher frequency mixer with coordinated pulsed mixer signal, a part of the signal energy is lost. This loss-associated effect is evident at the positions 24 where the control pulse of the mixer falls between start and stop pulse. In order to avoid this, according to the invention a plurality of mixer modules are used parallel to one another in the receiving channel. The phases of the control signals are shifted relative to one another by a fraction of the number of parallel mixers. This ensures that at least one of the mixers carries out effective signal sampling 23 and consequently no signal energy is lost. The sensitivity of such a receiving apparatus reaches that of a pulsed transit time measuring device and therefore differs considerably from that of a conventional phase measuring device.

It is evident to the person skilled in the art that the various arrangements of components or principles can be combined with one another in an alternative or supplementary manner.

The invention claimed is:

1. A method for electronic measurement based on the principle of heterodyne reception, comprising the acts:
    transmitting a pulsed electromagnetic radiation having at least one pulse repetition frequency to a target;
    receiving a back-scattered radiation from the target, the back-scattered radiation being converted into a received signal;
    converting down the received signal by mixing with at least two pulsed mixer signals to give at least two output signals, including:
        mixing the received signal with a first pulsed mixer signal for producing a first output signal having a frequency lower than the at least one pulse repetition frequency;

mixing the received signal with a second pulsed mixer signal for producing a second output signal having a frequency lower than the at least one pulse repetition frequency, wherein the first pulsed mixer signal is phase-shifted relative to the second pulsed mixer signal; and determining at least one time-related variable from at least the first and second output signals.

2. The method of measurement as claimed in claim 1, wherein a common aggregate is formed from the at least two output signals.

3. The method of measurement as claimed in claim 2, wherein the common aggregate is formed from all output signals combined in-phase to give a common signal aggregate.

4. The method of measurement as claimed in claim 1, wherein the pulsed mixer signals are produced and used according to the heterodyne method.

5. The method of measurement as claimed in claim 1, wherein the maximum number of pulsed mixer signals corresponds to twice the quotient of pulse period to pulse width of the radiation.

6. The method of measurement as claimed in claim 1, wherein during transmitting and receiving, a radiation passed via a reference distance:

is passed partly via a measured distance outside the device to at least one target to be measured; and partly via the reference distance inside the device, the radiation passed via the reference distance defining at least one start pulse and the back-scattered radiation passed via the measured distance defining at least one stop pulse, and in the determination of the at least one time-related variable, at least one distance to the at least one target is determined from the at least one output signal.

7. The method of measurement as claimed in claim 6, wherein the back-scattered radiation scattered back by the target is detected by a first receiver and the radiation passed via the reference distance is detected by a second receiver.

8. The method of measurement as claimed in claim 6, wherein the back-scattered radiation scattered back by the target and the radiation passed via the reference distance are detected by a common receiver so that the received signal has components of both the back-scattered radiation scattered back by the target and the radiation passed via the reference distance.

9. The method of measurement as claimed in claim 1, wherein a crosscorrelation of at least one pulse of the output signals coordinated with the pulsed mixer signals with a reference signal is effected.

10. The method of measurement as claimed in claim 9, wherein the crosscorrelation of at least one pulse of the output signals coordinated with the pulsed mixer signals with a reference signal is effected with a synthetically produced reference signal or reference signal stored from a preceding measurement.

11. The method of measurement as claimed in claim 1, wherein the pulsed electromagnetic radiation having at least one pulse repetition frequency is light.

12. A computer program product comprising program code, which is stored on a machine-readable medium, configured to carry out the following acts:

transmit a pulsed electromagnetic radiation having at least one pulse repetition frequency to a target;

receive a back-scattered radiation from the target, the back-scattered radiation being converted into a received signal;

mix the received signal with at least two pulsed mixer signals for producing at least two output signals having a frequency lower than the at least one pulse repetition frequency, wherein the at least two pulsed mixer signals are phase-shifted relative to one another; and determine at least one time-related variable from the at least one output signal.

13. The computer program product as claimed in claim 12, wherein the pulsed electromagnetic radiation having at least one pulse repetition frequency is light.

14. A measuring apparatus for electronic measurement based on the principle of heterodyne reception, comprising:

a pulsed radiation source for production and emission of pulsed electromagnetic radiation to a target;

a first receiver for reception and conversion of the radiation into at least one received signal from the target;

a component for providing at least one pulsed mixer signal;

a first mixer for mixing the at least one received signal with a first mixer signal for producing a first output signal having a frequency lower than the pulse repetition frequency;

at least one second mixer for mixing the at least one received signal with at least one second pulsed mixer signal for producing at least one second output signal having a frequency lower than the pulse repetition frequency; and a signal processor for processing at least one the first and second output signals.

15. The measuring apparatus as claimed in claim 14, wherein the component for providing at least one pulsed mixer signal is formed for providing at least two pulsed mixer signals phase-shifted relative to one another.

16. The measuring apparatus as claimed in claim 15, wherein the first mixer and the at least one second mixer are in the form of at least two electronic signal mixers in multi-channel heterodyne arrangement which are operated with different phases and connected in parallel.

17. The measuring apparatus as claimed in claim 14, further comprising a reference distance inside the device.

18. The measuring apparatus as claimed in claim 17, wherein the radiation is capable of being emitted simultaneously via a measured distance outside the device to at least one target to be surveyed and via the reference distance inside the device.

19. The measuring apparatus as claimed in claim 14, wherein the signal processor is formed for aggregation of at least two output signals.

20. The measuring apparatus as claimed in claim 19, wherein the signal processor is formed for aggregation of at least two output signals for the in-phase combination of all output signals to give a common signal aggregate.

21. The measuring apparatus as claimed in claim 14, further comprising a second receiver for receiving radiation passed via a reference distance, the first receiver being formed for reception of radiation scattered back by the target.

22. The measuring apparatus as claimed in claim 14, wherein the first receiver is formed for common reception of radiation scattered back by a target and radiation passed via a reference distance, so that the received signal has components of both radiation scattered back by the target and radiation passed via the reference distance.

23. The measuring apparatus as claimed in claim 14, wherein the pulsed radiation source produces and emits light.

* * * * *